United States Patent
Gupta et al.

(10) Patent No.: US 7,590,654 B2
(45) Date of Patent: Sep. 15, 2009

(54) TYPE DEFINITION LANGUAGE FOR DEFINING CONTENT-INDEX FROM A RICH STRUCTURED WINFS DATA TYPE

(75) Inventors: Anurag Gupta, Bellevue, WA (US); Sameet H. Agarwal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 215 days.

(21) Appl. No.: 11/480,721

(22) Filed: Jun. 30, 2006

(65) Prior Publication Data

US 2008/0005150 A1    Jan. 3, 2008

(51) Int. Cl.
G06F 17/30    (2006.01)

(52) U.S. Cl. ............... 707/103 R; 707/100; 707/101; 707/102; 707/104.1

(58) Field of Classification Search ............ 707/1, 707/3, 10, 100–104.1; 717/100, 104
See application file for complete search history.

(56) References Cited

U.S. PATENT DOCUMENTS

| | | | |
|---|---|---|---|
| 6,564,263 B1 | 5/2003 | Bergman et al. ......... 709/231 |
| 6,745,206 B2 * | 6/2004 | Mandler et al. ......... 707/104.1 |
| 6,910,029 B1 | 6/2005 | Sundaresan ............ 707/2 |
| 6,988,093 B2 | 1/2006 | Pic et al. ............. 707/1 |
| 2003/0033318 A1 | 2/2003 | Carlbom et al. ........ 707/102 |
| 2003/0187652 A1 | 10/2003 | Fairman ............... 704/270 |
| 2004/0168205 A1 | 8/2004 | Nesvadba ............. 725/136 |
| 2004/0172413 A1 | 9/2004 | Shin ................. 707/104.1 |
| 2005/0050537 A1 * | 3/2005 | Thompson et al. ....... 717/165 |
| 2005/0055354 A1 * | 3/2005 | Thompson et al. ....... 707/100 |
| 2005/0091188 A1 | 4/2005 | Pal et al. ............... 707/1 |
| 2005/0193005 A1 | 9/2005 | Gates et al. ........... 707/104.1 |
| 2005/0240596 A1 | 10/2005 | Worthen et al. ........ 707/10 |
| 2006/0074965 A1 * | 4/2006 | Cunningham et al. .... 707/102 |

FOREIGN PATENT DOCUMENTS

WO    WO 00/57306    9/2000

OTHER PUBLICATIONS

Hardy, D. et al., "Customized Information Extraction as a Basis for Resource Discovery," http://www.codeontheroad.com/papers/Essence.Jour.pdf, 1995, 1-19.
IBM, "DB2 Content Management", IBM Software, http://www-306.ibm.com/software/data/cm/, downloaded Mar. 9, 2006, 2 pages.
Nstein Technologies, "About Nserver e-publisher Suite", http://www.nstein.com/epub/nserver-about.asp, 2006, 1 page.

* cited by examiner

*Primary Examiner*—Cam-Linh Nguyen
(74) *Attorney, Agent, or Firm*—Woodcock Washburn LLP

(57) ABSTRACT

An XML based type-definition language for declaring content-index for WinFS Types is provided. Content-index declarations can be specified for the Item type as well as it's sub-entities like Fragments, etc across Item type hierarchies. The properties of WinFS types in the schema are marked for content-indexing by the schema designer. Installing the content-index definitions includes parsing content-index definitions in the schema, generation of appropriate SQL statements for data extraction and storing the SQL statements.

20 Claims, 9 Drawing Sheets

```
<Schema Namespace="MySchema">

<!-- WinFS Type declaration -->

<EntityType Name="Message"  BaseType="System.Storage.Item" >
        <Property Name="Subject" Type="String" />
    </EntityType>

<EntityType Name="Participant"  BaseType="System.Storage.Fragment" >
        <Property Name="DisplayName" Type="String" />
    </EntityType>

<EntityType Name="Address"  BaseType="System.Storage.Fragment" >
        <Property Name="Street" Type="String" />
    </EntityType>

<Composition Name="MessageParticipants1">
        <End Type="Message"/>
        <End Type="Participant" Multiplicity="0..*" />
    </Composition>

<Composition Name="ParticipantAddresses">
        <End Type="Participant"/>
        <End Type="Address" Multiplicity="0..*" />
    </Composition>

<!-- Content-Index declaration -->

<ContentIndex Name = "MessageContentIndex" Type = "Message">
        <ContentIndexField Property = "Subject"/>
        <ContentIndexComposition Name = "MessageParticipants1">
            <ContentIndexFragment Type = "Participant"  AsFragmentType = "Participant">
                <ContentIndexField Property = "DisplayName"/>
            </ContentIndexFragment>
        </ContentIndexComposition>
    </ContentIndex>

</Schema>
```

```
<Schema Namespace="MySchema">

<!-- WinFS Type declaration -->

<EntityType Name="Message"  BaseType="System.Storage.Item" >
      <Property Name="Subject" Type="String" />
    </EntityType>

<EntityType Name="Participant"  BaseType="System.Storage.Fragment" >
      <Property Name="DisplayName" Type="String" />
    </EntityType>

<EntityType Name="Address"  BaseType="System.Storage.Fragment" >
      <Property Name="Street" Type="String" />
    </EntityType>

<Composition Name="MessageParticipants1">
      <End Type="Message"/>
      <End Type="Participant" Multiplicity="0..*" />
    </Composition>

<Composition Name="ParticipantAddresses">
      <End Type="Participant"/>
      <End Type="Address" Multiplicity="0..*" />
    </Composition>

<!-- Content-Index declaration -->

<ContentIndex Name = "MessageContentIndex" Type = "Message">
      <ContentIndexField Property = "Subject"/>
      <ContentIndexComposition Name = "MessageParticipants1">
        <ContentIndexFragment Type = "Participant"  AsFragmentType = "Participant">
           <ContentIndexField Property = "DisplayName"/>
        </ContentIndexFragment>
      </ContentIndexComposition>
    </ContentIndex>

</Schema>
```

TYPE DEFINITION LANGUAGE FOR DEFINING CONTENT-INDEX FROM A RICH STRUCTURED WINFS DATA TYPE

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2006, Microsoft Corp.

BACKGROUND

Storage systems such as WinFS (Microsoft Windows® Future Storage or Microsoft Windows® File System), for example, allow different kinds of data to be identified by metadata and uses it to set up relationships among data, thereby giving a semantic structure to the data. These relationships can then be used by a relational database to enable searching and dynamic aggregation of the data, allowing the data to be presented in a variety of ways. WinFS includes a relational database engine, derived from the Microsoft® SQL Server 2005 (SQL) database platform, to facilitate this.

Content-indexing of WinFS data is strategically important for allowing WinFS applications and users to search and find data stored in WinFS stores, without having to necessarily know the structure of the data. It enables applications to provide end-users with richer and advanced data exploration capabilities over WinFS items, making it easier for users to find their information.

Thus, needed are processes and a system that addresses the shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, defining content-indexable data from a rich structured type and it's processing is provided. For several embodiments, a method for providing content index information for a data item comprises providing a schema containing content index definitions using the prescribed language for the item, generating appropriate query language statements for content index data extraction based on the schema, and storing the generated query language statements in a file system store as part of it's processing.

Also, a system for defining content-indexable properties in rich structured data types comprises means for a schema designer to annotate type properties in the schema by marking said type-properties for content indexing using an XML based type definition language.

Other advantages and features of the invention are described below.

BRIEF DESCRIPTION OF THE DRAWINGS

Defining and extracting content-indexable data from a rich structured type is further described with reference to the accompanying drawings in which:

FIG. 8 is an example of XML code for content-index declaration in a schema;

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Example Computing Environments

Figure 1:
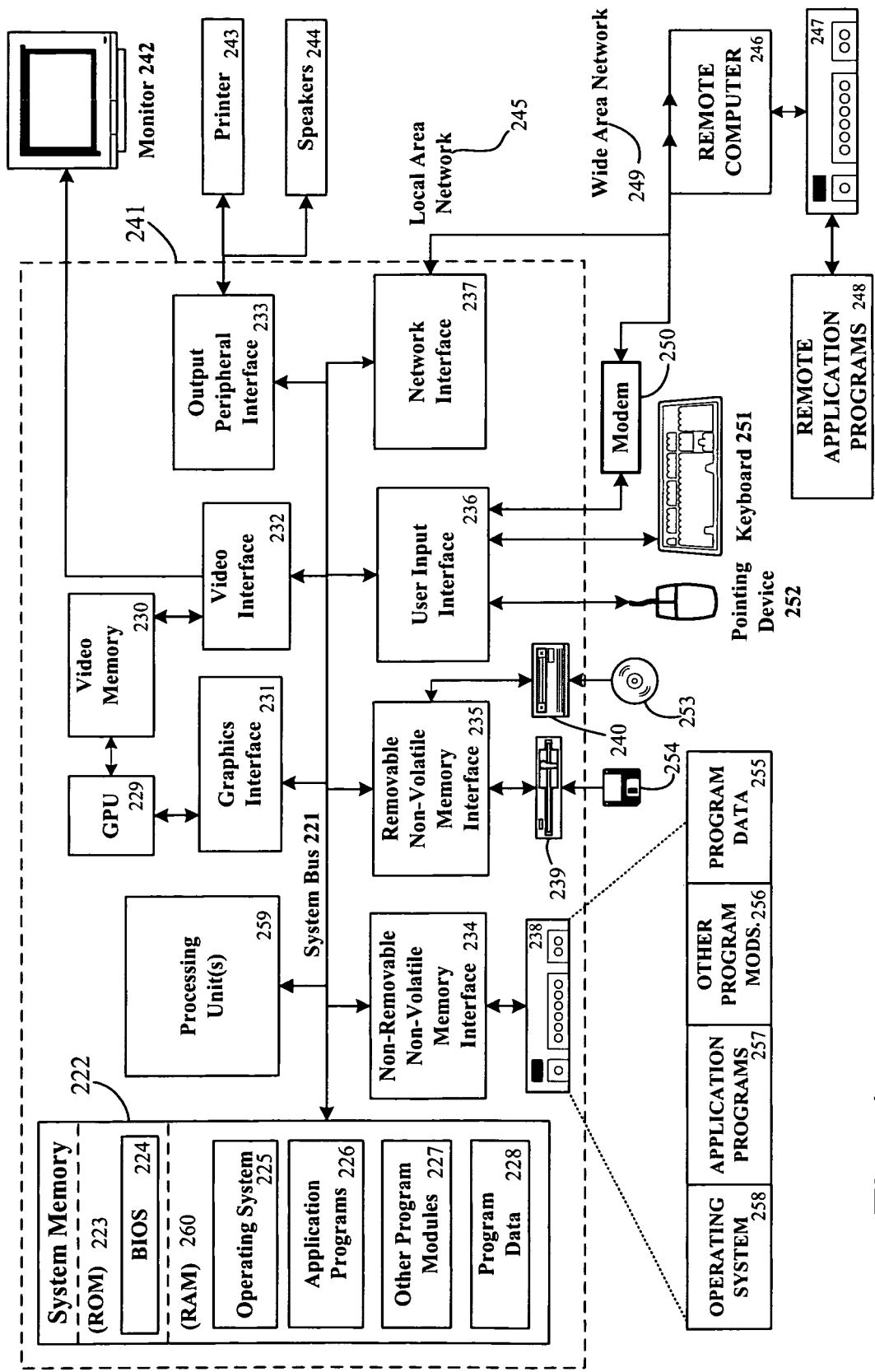
FIG. 1 is a block diagram representing an exemplary computing device suitable for use in conjunction with defining and extracting a flat list of search properties from a rich structured type.

Referring to FIG. 1, shown is a block diagram representing an exemplary computing device suitable for use in conjunction with implementing the processes described above. For example, the computer executable instructions that carry out the processes and methods for defining and extracting a flat list of search properties from a rich structured type may reside and/or be executed in such a computing environment as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220. For example a computer game console may also include those items such as those described below for use in conjunction with implementing the processes described above.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessorbased systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

Figure 2:
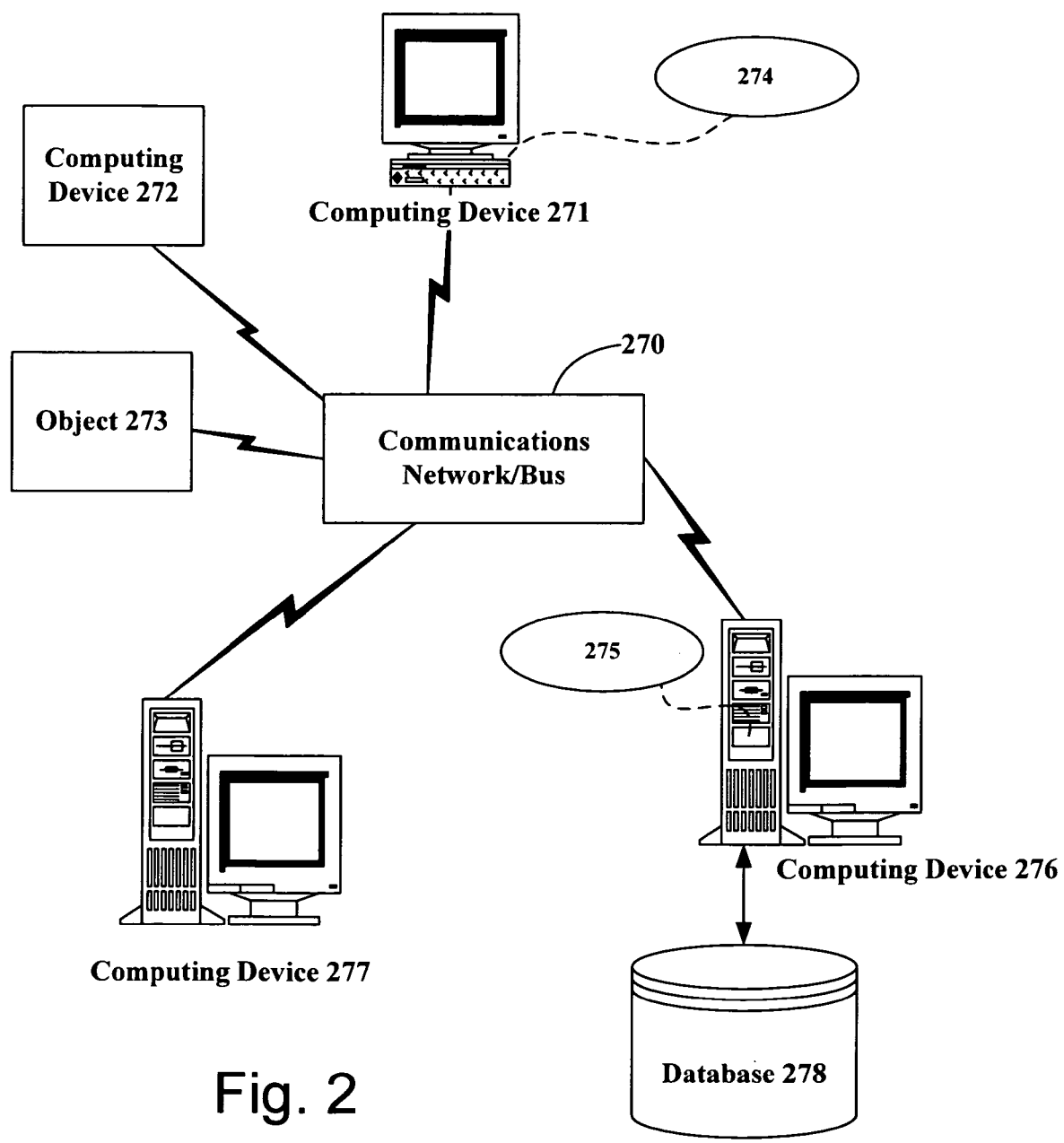
FIG. 2 illustrates an exemplary networked computing environment in which many computerized processes may be implemented to perform defining and extracting a flat list of search properties from a rich structured type.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing the defining and extracting of a flat list of search properties from a rich structured type. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the invention should not be limited to any single embodiment, but rather should be construed in breadth and scope in accordance with the appended claims.

Microsoft Windows® File System (WinFS®)

Although the concepts, ideas and features described herein are described in an exemplary fashion with respect to how they are implemented in a file system called Microsoft Windows® Future Storage or Microsoft Windows® File System (WinFS) and the Microsoft Windows Vista® operating system (formerly code-named "Longhorn"), implementations in and applicability to other operating and file systems are contemplated, entirely possible and apparent to those skilled in the art based on the exemplary descriptions provided herein. Provided below is a background and overview of WinFS largely from http://en.wikipedia.org/wiki/WinFS including description of the data storage, data model, type system, relationships, rules, access control, data retrieval, search and data sharing aspects of WinFS.

WinFS is a data storage and management system based on relational databases, developed by Microsoft Corp. (headquartered in Redmond, Wash.) for use as an advanced storage subsystem for the Microsoft Windows® operating system.

Implemented on top of the NT File System (NTFS), one of the file systems for the Microsoft Windows NT® operating system, WinFS is a centralized data store for the Microsoft Windows® platform. It allows different kinds of data to be identified by metadata and uses them to set up relationships among data, thereby giving a semantic structure to the data. These relationships can then be used by a relational database to enable searching and dynamic aggregation of the data, allowing the data to be presented in a variety of ways. WinFS includes a relational database engine, derived from the Microsoft® SQL Server 2005 (SQL) database platform, to facilitate this.

Previously, file systems viewed files and other file system objects only as a stream of bytes, and had no information regarding the data that is stored in the files. They also provided only a single way of organizing the files, and that is via folders and file names. Because such a file system has no knowledge about the data it stores, the applications creating the file tend to use specific, often proprietary, file formats, i.e., the data can be interpreted only by the application that created it. This leads to proliferation of application-specific file formats and hampers sharing of data between multiple applications. It becomes difficult to create an application which processes information from multiple file types because the programmers have to understand the structure of all the files where the source data could reside and then figure out how to filter out the necessary information from all the information that will be stored in the file. If more than one file type stores the same data in different formats, it becomes necessary to convert them to a single format before they can be used. Though common file formats can be used as a workaround to this problem, they do not present a universal solution; there is no guarantee that any given application will be able to access the data.

As a result of the above mentioned properties of file systems, data from multiple applications cannot be easily aggregated. The only knowledge that the file system has about the data is the name of the file the data is stored in. As a result of this, file systems can retrieve and search data based only on the filename. A better solution would be the use of attributes, independently exposed by each file, recognizable by either the file system natively, or via some extension. Attributes are metadata about the files such as type of file (e.g., document, picture, music etc.), creator, artist, etc. This allows files to be searched for by its attributes, in ways not possible using only the folder hierarchy, such as finding "pictures which have person X". Desktop search applications take this concept a step further. They index the files, including the attributes and, using file filters, extract data from different file formats. Different filters have to be used for different file formats. This allows for searching on both the file's attributes and the data contained in the file.

However, they still don't promote data sharing as the data they extract is stored in a format specific to the desktop search application, in a format which enables fast searching. Desktop search applications can only find information, and can't help users with anything that needs to be done with the searched information. Also, this approach doesn't solve the problem of aggregating data from two or more applications. For example, it is nearly impossible to search for "the phone numbers of all persons who lives in some city X and has more than 100 appearances in my collection of photos and with whom I have had e-mail within last month." Such a search encompasses data across three applications—address book for phone numbers and address, photo manager for information on who appears in which photo, and the e-mail application to know the e-mail acquaintances.

This is where WinFS comes into effect. The artificial organization using names and location is done away with, and a more natural organization is created, one using attributes to describe the data in files and the relation of that data with other data. By creating a unified datastore, it promotes sharing and reuse of data between different applications. The advantage is that any application, or even the file browser, can understand files created by any application. Addition of attributes will give further meaning to the data, such as "which persons appear in which pictures," and "the person an e-mail was addressed to." But, instead of viewing the pictures and e-mails and files, WinFS recognizes picture, and e-mail to be specific types of data, which are related to person using the relation "of some person." So, by following the relation, a picture can be used to aggregate e-mails from all the persons in the picture and, conversely, an e-mail can aggregate all pictures in which the addressee appears in. WinFS extends this to understand any arbitrary types of data and the relations that hold them together. The types and relations have to be specified by the application that stores the data, or the user, and WinFS organizes the data accordingly.

WinFS stores data in virtual locations called stores. A WinFS store is a common repository where every application will store their data, along with its metadata, relationships and information on how to interpret the data. In this way, WinFS does away with the folder hierarchy, and allows searching across the entire repository of data.

WinFS store is actually a relational store, where applications can store their structured as well as unstructured data. Based on the meta-data (metadata), type of data, and also the relationships of the data with other data as will be specified by the application or the user, WinFS will assign a relational structure to the data. By using the relationships, WinFS aggregates related data. WinFS provides a unified storage but stops short of defining the format that is to be stored in the data stores. Instead, it supports data to be written in application specific formats. But applications must provide a schema that defines how the file format should be interpreted. For example, a schema could be added to allow WinFS to understand how to read and thus be able to search and analyze, say, a Portable Document Format (PDF) file. By using the schema, any application can read data from any other application, and also allows different applications from writing in each other's format by sharing the schema.

Multiple WinFS stores can be created on a single machine. This allows different classes of data to be kept segregated, for example, official documents and personal documents can be kept in different stores. WinFS, by default, provides only one store, named "DefaultStore." WinFS stores are exposed as shell objects, akin to virtual folders, which dynamically generates a list of all items present in the store and presents them in a folder view. The shell object also allows searching information in the datastore.

WinFS is not a physical file system. Rather, it provides rich data modeling capabilities on top of the NTFS file system. It still uses NTFS to store its data in physical files. WinFS uses a relational engine, which is derived from Microsoft® SQL Server 2005, to provide the data relations mechanism, as the relation system in WinFS is very similar to the relation system used in relational databases. WinFS stores are SQL Server database (.MDF) files with the FILESTREAM attribute set. These files are stored in secured folder named "System Volume Information" placed into the volume root, in folders under the folder "WinFS" with names of GUIDs of these stores.

WinFS also allows programmatic access to its features, for example, via a set of Microsoft® .NET (.NET) application programming interfaces (APIs), that enables applications to define custom made data types, define relationships among data, store and retrieve information, and allow advanced searches. The applications can then use novel ways of aggregating data and presenting the aggregated data to the user.

WinFS Data Storage

A data unit that has to be stored in a WinFS store is called a WinFS item. A WinFS item, along with the core data item, also contains information on how the data item is related with other data. A WinFS Item can further consist of sub-entities called Fragments. WinFS allows Items and Fragments to be related together in different ways. The different types of relationships are:

Containment: Containment is an owning relationship. In an owning relationship there is a parent entity and an child entity Item References: ItemReferences are a Fragment type that define an relationship that contains data between two item instances based on the items keys (ItemId). The ItemReferences are directed—one item is the source of the ItemReference and the other item is the target.

Condition based association: Condition based association enable declaration of relationships between items that are based on a value of a condition. The condition is an expression that uses values of the properties of the related items types.

WinFS helps in unification of data and thus reduce redundancies. If different applications store data in a non interoperable way, data has to be duplicated across applications which deal with same data. For example, if more than one e-mail application is used, the list of contacts must be duplicated across the two. So, when there is any need for updating contact information, it must be done at two places. If, by mistake, it is not updated in one of the applications, it will continue to have outdated information. But with WinFS, an application can store all the contact information in a WinFS store, and supply the schema in which it is stored. Then other applications can use the stored data. By doing so, duplicate data is removed, and with it the hassles of manually synchronizing all instances of the data.

WinFS Data Model

WinFS models data using the data items, along with its relationships, extensions and rules governing its usage. WinFS needs to understand the type and structure of the data items, so that the information stored in the data item can be made available to any application that requests it. This is done by the use of schemas. For every type of data item that is to be stored in WinFS, a corresponding schema needs to be provided which will define the type, structure and associations of the data. These schemas are defined, for example, using Extensible Markup Language (XML). XML allows designers to create their own customized tags, enabling the definition, transmission, validation, and interpretation of data between applications and between organizations.

Predefined WinFS schemas include schemas for messages, contacts, calendar, file items, etc and also includes system schemas that include configuration, programs, and other system-related data. Custom schemas can be defined on a per-application basis, in situations where an application wants to store its data in WinFS, but not share the structure of that data with other applications, or they can be made available across the system.

WinFS Type System

The most important difference between other file systems and WinFS is that WinFS knows the type of each data item that it stores, and the type specifies the properties of the data item. The WinFS type system is closely associated with the .NET Framework's concept of classes and inheritance. A new type can be created by extending and nesting any predefined types.

Figure 3:
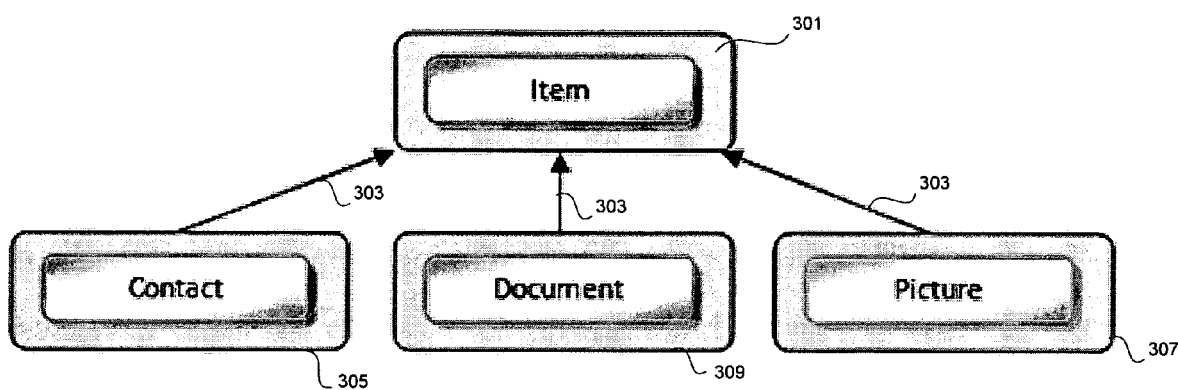
FIG. 3 is a block diagram illustrating an exemplary type hierarchy.

Referring next to FIG. 3, shown is a block diagram illustrating an exemplary type hierarchy. Shown is item 301 defined by other items contact 305, document 309 and picture 307 nested within it.

In particular, WinFS provides four predefined base types: Items, Relationships, ScalarTypes and ComplexTypes. An Item is the fundamental data object, which can be stored, and a Relationship is the relation or link between two data items. Generally, since all WinFS items must have a type, the type of item stored defines its properties. The properties of an Item may be a ScalarType, which defines the smallest unit of information a property can have, or a ComplexType, which is a collection of more than one ScalarTypes and/or ComplexTypes. All WinFS types are made available as .NET Common Language Runtime (CLR) classes. CLR is the core runtime engine in the Microsoft® .NET Framework for executing applications.

Any object represented as a data unit, such as contact, picture, document, etc, can be stored in a WinFS store as a specialization of the Item type. By default, WinFS provides Item types for Files, Contacts, Calendar, and Messages. The File Item can store any generic data, which is stored in file systems as files. But unless an advanced schema is provided for the file, by defining it to be a specialized Item, WinFS will not be able to access its data. Such a file Item can only support being related to other Items. A developer can extend any of these types, or the base type Item, to provide a type for his or her custom data.

Figure 4:
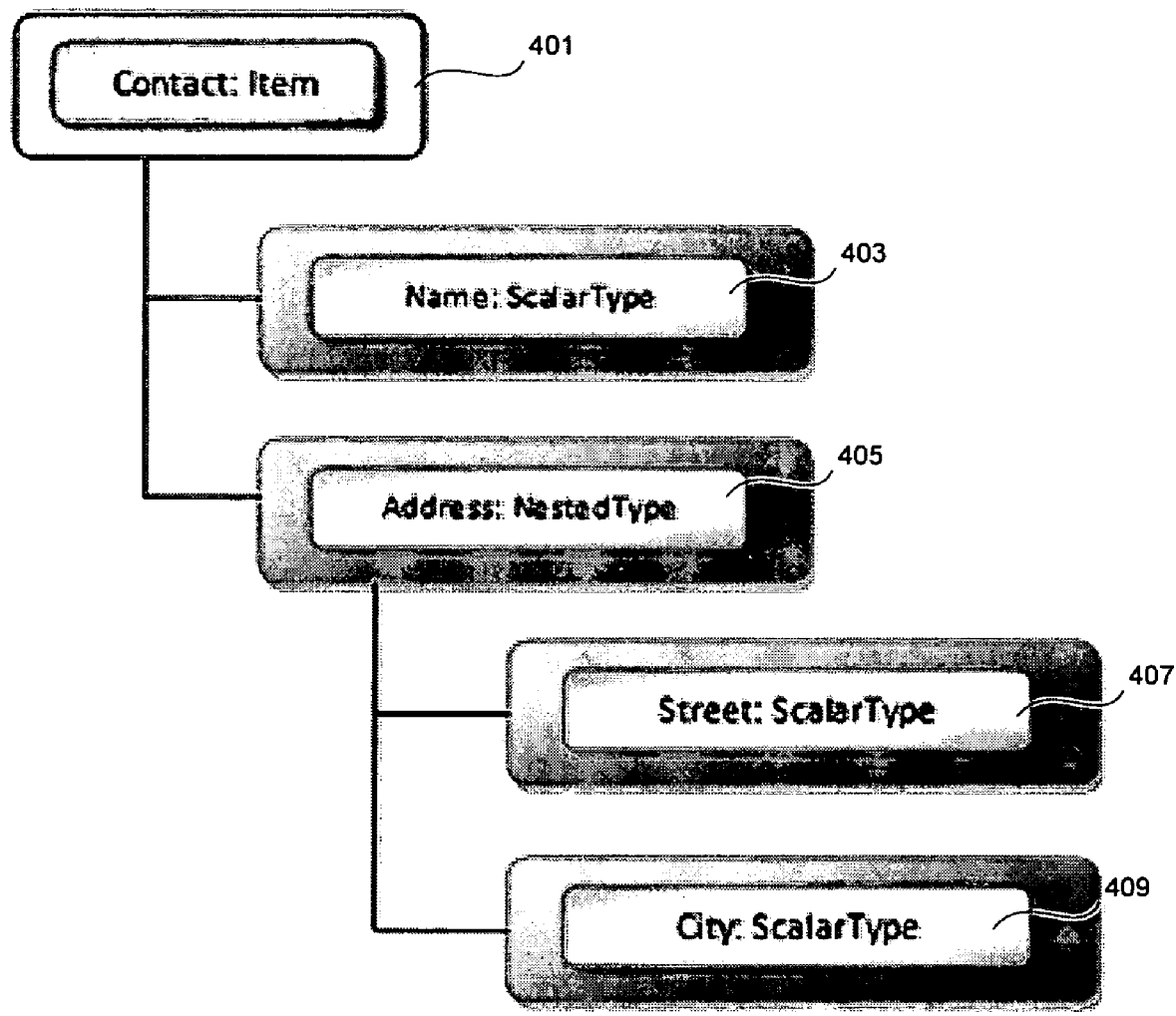
FIG. 4 is a block diagram illustrating an example use of predefined types in defining a new type.

Referring next to FIG. 4, shown is a block diagram illustrating an example use of the predefined types in defining a new type. The data contained in an Item is defined in terms of properties, or fields which hold the actual data. For example, an Item Contact 401 may have a field Name 403 which is a ScalarType, and one field Address 405, a ComplexType, which is further composed of two ScalarTypes Street 407 and City 409. To define this type, the base class Item is extended and the necessary fields are added to the class. A ComplexType field can be defined as another class which contains the two ScalarType fields. Once the type is defined, a schema has to be defined, which denotes the primitive type of each field, for example, the Name field 403 is a String, the Address field 405 is a custom defined Address class, both the fields of which 407 409 are Strings. Other primitive types that WinFS supports are Integer, Byte, Decimal, Float, Double, Boolean and DateTime, among others. The schema will also define which fields are mandatory and which are optional. The Contact Item 401 defined in this way will be used to store information regarding the Contact, by populating the properties field and storing it. Only those fields marked as mandatory needs to be filled up during initial save. Other fields may be populated later by the user, or not populated at all. If more properties fields, such as "last conversed date", needs to be added, this type can be simply extended to accommodate them. Item types for other data can be defined similarly.

Figure 5:
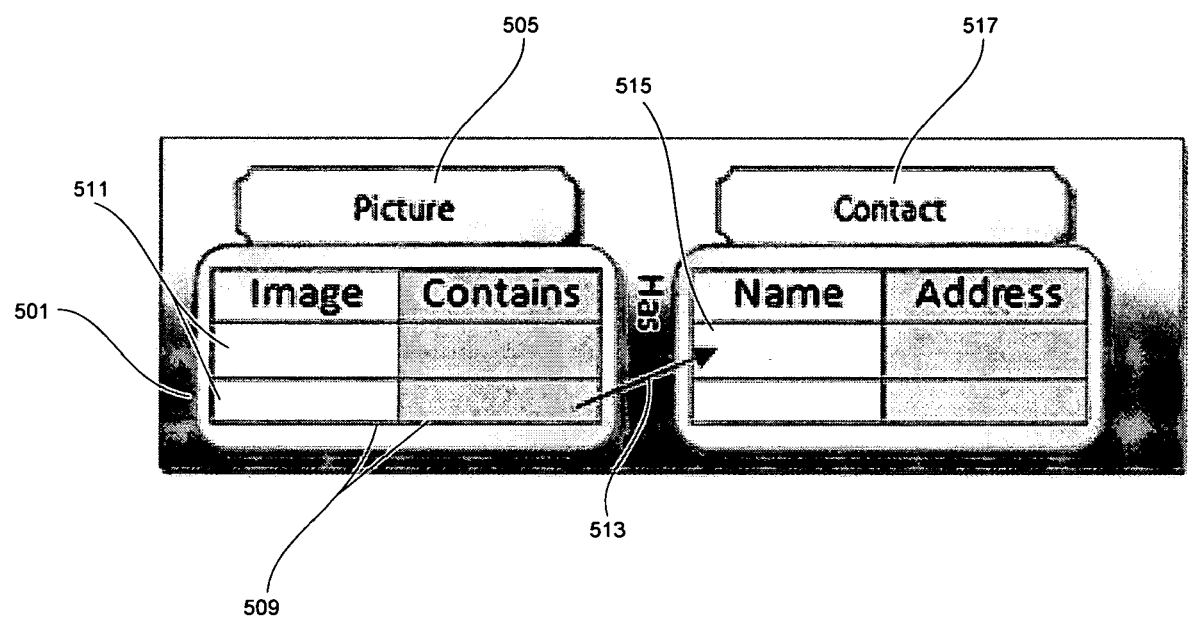
FIG. 5 is a block diagram illustrating an exemplary relation stored as a reference to a particular row in the table of an item.

Referring next to FIG. 5, shown is a block diagram illustrating an exemplary relation stored as a reference to a particular row in the table of an item. WinFS creates a table 501 for all defined Items 505. All the fields defined for the Item 505 form the columns 509 of the table 501 and all instances of the Item 505 are stored as rows 511 in the table 501 for the respective Item 505. A Relation 513 is stored as a reference to the particular row 515 in the table of the Item 517, which holds the instance of the target Item 517 with which the current Item 505 is related. All Items 505 517 are exposed as .NET CLR objects, with uniform interface providing access to the data stored in the fields. Thus any application can retrieve object of any Item type and can use the data in the object, without being bothered about the physical structure the data was stored in.

WinFS Relationships

Items can be related to one more other items, giving rise to a one-to-one relationship, or with more than one item, resulting in a one-to-many relationship. The related items, in turn, may be related to other data items as well, resulting in a network of relationships, which is called a many-to-many relationship. Creating a relationship between two items creates another field in the data of the items concerned, which refer to the row in the other item's table where the related object is stored.

Figure 6:
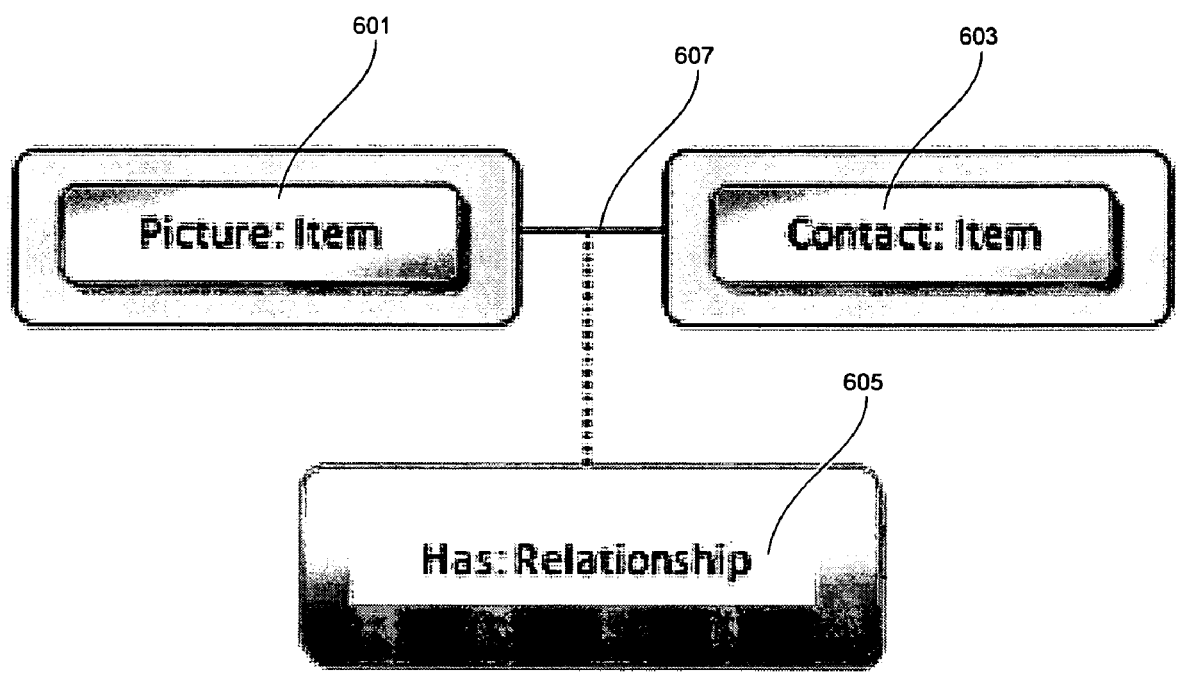
FIG. 6 is a block diagram illustrating an exemplary relationship between two items.

In WinFS, a Relationship can be one of the following:
Containment
Item References
Condition based association Referring next to FIG. 6, shown is a block diagram illustrating an exemplary relationship between two items (Item Reference). A Relationship 605 represents a mapping 607 between two items, a Source 601 (e.g., a picture item) and a Target 603 (a e.g., a contact item). From the point of view of the Source item 601, the relationship is an Outgoing Relationship, whereas from that of the target item 603, it is an Incoming Relationship. Relationships are bidirectional, which means that if Source 601 is related with Target 603, the Target 603 is also related with the Source 601. WinFS provides three types of primitive relationships—Containment, ItemReference, Condition based association.

- Containment: Containment is an owning relationship. In an owning relationship there is a parent entity and an child entity
- Item References: ItemReferences are a Fragment type that define an relationship that contains data between two item instances based on the items keys (ItemId). The ItemReferences are directed—one item is the source of the ItemReference and the other item is the target.
- Condition based association: Condition based association enable declaration of relationships between items that are based on a value of a condition. The condition is an expression that uses values of the properties of the related items types.

WinFS Rules

WinFS includes Rules, which are executed when certain condition is met. WinFS rules work on data and data relationships. For example, a rule can be created which states that whenever an Item is created which contains field "Name" and if the value of that field is some particular name, a relationship should be created which relates the Item with some other Item. WinFS rules can also access any external application. For example, a rule can be built which launches a Notify application whenever a mail is received from a particular contact. WinFS rules can also be used to add new properties fields to existing data Items.

WinFS rules are also exposed as .NET CLR objects. As such any rule can be used for any other purposes. They can be even extended by inheriting them to form a new rule which consists of the condition and action of the parent rule plus something more or new.

WinFS Access Control

Even though all data is shared, everything is not equally accessible. WinFS uses Microsoft® Windows' authentication system to provide two data protection mechanisms. First, there is share-level security that controls access to the WinFS share. Second, there is item level security that supports Microsoft® Windows NT compatible security descriptors. The process accessing the item must have enough privileges to access it. Also in Microsoft® Windows Vista, there is the concept of "integrity level" for an application. A higher integrity data cannot be accessed by a lower integrity process.

WinFS Data Retrieval

The primary mode of data retrieval from a WinFS store is searching for the required data and enumerating through the set of Items that has been returned. WinFS also supports retrieval of the entire collection of Items that is stored in the WinFS store, or returning a subset of it which matches the criteria that has been queried for.

WinFS makes all data available as CLR objects. So the data retrieved, which is encapsulated as an object, has intrinsic awareness of itself. By using the abstraction provided by use of objects, it presents a uniform interface to hide its physical layout and still allow applications to retrieve the data in an application-independent format, or to get information about the data such as its author, type, and its relations.

For each Item that has been returned, WinFS can also return a set of Relations which specify the Relations the Item is involved in. WinFS can return all the relations of the Item, or can return Relations that conform to a queried criterion. For each pair or Item and Relation, WinFS can retrieve the Item which forms the other end of the Relation. Thus, by traversing the Relations of an Item, all the Items that are related with the Item can be retrieved.

WinFS Search Application Programming Interface

WinFS application programming interface (API) provides a class called the ItemContext class, which is used to query for and update WinFS Items. The criterion for the query is expressed using an ESQL (Entity SQL) query string, which is derived from Transact SQL (TSQL) and extends it with additional support for rich types, collections and objects. As an example, the following query will return a collection of messages located in a folder given the folder's ItemId (@itemId) and that has a Title that starts with a specified string:

select msg from Offype(Items, System.Storage.Message) as msg
where msg.Title like "Travel to %" and ContainerItemId=@itemId The above statement is very similar to a transact SQL statement with the addition of a new operator of Type. Joins, order by group by, aggregate functions, nested queries can also be used in ESQL. ESQL however does not provide 100% compatibility with TSQL.

An ESQL query can specify a single search condition or a compound condition ESQL queries can also be used with relations to find related data.

WinFS Data Sharing

WinFS is about sharing data. It allows easy sharing of data between applications. Not just that, there is provision to share data among multiple WinFS stores as well, which might reside in different computers, by copying to and from them. A WinFS item can also be copied to a non WinFS file system, but unless that data item is put back into WinFS store, it won't support the advanced services provided by WinFS.

WinFS API also provides some support for sharing with non-WinFS applications. WinFS exposes a shell object to access WinFS stores. This object, which maps the WinFS items to a virtual folder hierarchy, can be accessed by any application. Non-WinFS file formats can be stored in WinFS stores as well, using the File Item, provided by WinFS. Importers can be written which convert specific file formats to WinFS Item types.

WinFS data can also be manually shared using network shares, by sharing the legacy shell object. In addition, WinFS provides synchronization services to automatically synchronize Items in two or more WinFS stores, subject to some predefined condition, such as share only photos or share photos which have an associated contact. The stores may be in the same computer or on different computers. Synchronization is done in a peer-to-peer mode, eliminating the need to any central authority to manage the synchronization. Whenever a synchronization, which can be either manual or automatic or scheduled, is initiated, WinFS enumerates the changes, i.e., it finds out which Items are new or changes, and therefore in need of synchronization, and then update accordingly. If two or more changes are conflicting, WinFS can either resort to automatic resolution of the conflict, based on predefined rules, or can defer them for manual resolution. WinFS also updates the schemas, if required.

Defining and Extracting a Flat List of Search Properties in WinFS and Alignment with WDS Extracting Microsoft® Windows Vista operating system (i.e., Windows or Windows Vista) search properties from WinFS data is important to allow WinFS applications to search and categorize data in WinFS. Applications that are WinFS type agnostic can just operate on these search properties rather than operating on the individual types. Since these properties are stored in Windows Desktop Search (WDS) store as well, it allows non WinFS applications written against WDS application programming interfaces (APIs) to also view search properties from WinFS data.

Also, the WinFS independent software vendors (ISVs) can pick the metadata/search properties for their types without compromising their item schema design. The ISVs specify mappings between WinFS types and the Windows search properties. These mappings can be specified by a type designer as schema files. For file stream contents in file items, WinFS leverages the Property handlers registered with the Windows property system and extract appropriate search properties.

Figure 7:
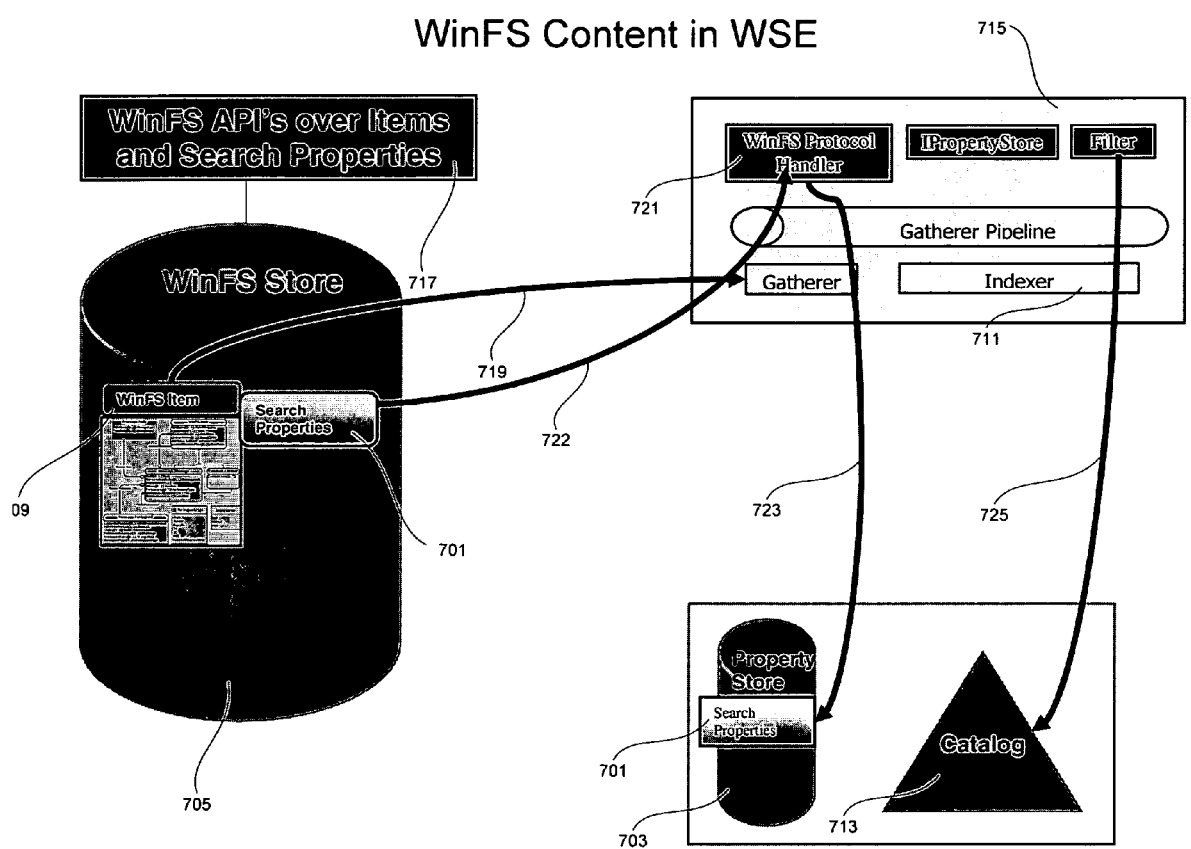
FIG. 7 is a block diagram illustrating as an example the alignment of Microsoft Windows® File System (WinFS®) content in a Microsoft Windows® Desktop Search (WDS)

Referring next to FIG. 7, shown is a block diagram illustrating as an example the alignment of WinFS content in WDS to accomplish the above objectives. As shown, WinFS notifies 719 WDS about WinFS item 709 changes. Then the Protocol Handler 721 is invoked by WDS 715. Search properties 701 for the item 709 are then extracted and stored 722 723 in WinFS Store 705 and WDS property store 703 using the WDS components. Properties of WinFS items 709 can then be used in Windows Vista search and in organization capabilities similar to any other content in Windows Vista. WinFS items 709 are full-text indexed 725 using the Windows Search indexer 711. Indexes for WinFS items 709 are stored in the common index catalog 713 defined as part of the WDS 715. Full-text queries in Windows platform return WinFS items 709 alongside other non-WinFS content.

WinFS API 717 surface programs against search properties 701 associated with an item 709. This includes querying for these properties 701 and allows updates to these properties 701. The WinFS API 717 query syntax allows making use of WDS full text query operations. Full-text queries through the WinFS API 717 are also satisfied by the common index catalog 713 maintained by WDS. The WinFS Shell Namespace Extension (WinFS SNE) handles generic shell operations over WinFS items 709 like double-click bindings, icons, thumbnails, etc. WinFS SNE allows updates of search properties 701 of WinFS Items 709 using the WinFS API 717.

Out-of-the-box WinFS schemas accommodate search property 701 mapping definitions and corresponding schema types.

As shown above, rich structured data in WinFS is mapped into a set of Windows search properties 701, which is a flat list. These properties 701 are stored both in the WDS Store (i.e., WDS property store 713) and in the WinFS Store 705. This is applicable not only to WinFS but any rich structured data that should be mapped into Windows search properties 701.

A mapping language is used for mapping search properties from rich structured data types declared as part of a WinFS type schema. For example, this mapping language uses a query language for operating on entities in WinFS. The mapping is specified in a separate file from the schema definition using an XML syntax. Windows search properties can be defined in terms of schematized properties, with simple functions over them, such as WindowsSearchName :=Contact.FirstName+" "+Contact.LastName. Referring next to FIG. 8, shown is an example of such XML code for search property mappings.

In addition, if the type designer desires these search properties to be updateable, he/she to provides C# code for doing the reverse mapping from search properties to the appropriate native type properties. This reverse mapping indicates that when the user changes the value of search property through WinFS API, this supplied C# code will be invoked to change the appropriate native type properties.

The process involved in defining and compiling these mappings is as follows. For defining the mappings at build time, the type designer defines his/her types in the schema and generates the client C# classes using the normal schema install mechanism. The type designer (or a separate mapping designer), defines the Object Structured Query Language (ESQL) mapping expressions from the WinFS type properties to the Windows search properties. These mappings are provided in a separate mapping file (see FIG. 8). This file is also compiled through WinFS APIG to generate C# classes. C# classes are compiled to generate the client assembly.

The mapping file, using specific schema definition language (XML) constructs, can contain the ESQL mapping form multiple types from many different schemas. ESQL Mapping and Update-code for search properties are defined on Item, and should be defined/implemented on Item. The ESQL expression can refer to Links and Fragments for types defined in the same schema or schemas being referenced through a 'using' clause in the schema file where Item is defined. The mappings are installed in an assembly. If an assembly contained mappings for more than one (item) type, one would still install all the mappings in that assembly.

Defining and Extracting Content-Indexable Data

A content-index type definition language is used for defining content-indexable properties (i.e., creating a content index specification) in rich structured data types declared as part of the WinFS type schema. These properties can then be used by WinFS applications for performing content-index or full-text searches. The schema designer annotates the WinFS type properties in the schema by marking them for content-indexing using the type definition language. Referring next to FIG. 8, provided is an example of such annotation in a schema using the content-index type definition language. Properties in Items, Fragments, Complex and Item Reference types can be marked for indexing. In addition, content-indexes can be declared across Item type hierarchies.

The content-index definition for a given type is defined in the schema where the type is defined. When the schema is installed, the full-text index specification is processed by the full-text schema handling component of the installer. During the processing, SQL statements are generated that extract the value of the properties specified for full-text indexing. These statements are generated for each type of entity in the schema, and stored in an internal table.

If an Item, Fragment, Item Reference, etc are added independently in another schema, then during the installation of that schema the SQL for the item type where the Item, Fragment, Item Reference, etc will be added is modified to include extraction of the that Item, Fragment, Item Reference, etc. Note that at the instance level, if there is no instance of the corresponding Item, Fragment, ComplexType, Item Reference, etc then the query will return no data which will be filtered out before returning to the application.

When a schema is uninstalled the SQL generated from the content-index declarations for the Types in the schema being uninstalled are removed. Since the content indexes for a Type must be declared in the same schema as the one where the indexed top-level Item Type is defined, it is possible to uninstall all the content indexes defined for an Item and it's sub-entity Type when the Type is uninstalled (i.e. the schema is uninstalled).

Since a schema is uninstalled when there are no instances of the Types defined in that schema, there is no need to do any re-indexing of items when a schema is uninstalled.

The specification for defining the full-text indexes in the schema is of the following form:

Content-Index Type Definition Language

The type definition language for content-index declarations is defined below:

ContentIndex

The ContentIndex element is used to declare a content index on WinFS properties. A content index can be declared on the properties of Item or Item Reference type. It can also be declared on properties of a Complex type or Fragment type, when this Compels or Fragment type gets used inside an Item or Fragment type, through a Composition for the latter. A ContentIndex element contains zero or more ContentIndexField declarations or zero or more ContentIndexInlineField or zero or more ContentIndexComposition declarations.

| | Attributes | | |
|---|---|---|---|
| Attribute Name | Description | Type | Required |
| Name | A name for the content index grouping | WinFSName | Always |
| Type | Name of the Item/Link type on which the content index is defined. | WinFSName | Always |

| Parent Elements | Schema | |
|---|---|---|
| *Child Element Sequence* | | |
| Element | Occurrences | Notes |
| Documentation | 0:1 | Documentation |
| ContentIndexField | 0:n | Specifies a property on which the content index is defined. The property has to be of WinFS type 'String' |
| ContentIndexComplex Field | 0:n | Specifies an Complex Type property on which the content index is defined. |
| ContentIndexComposition | 0:n | Specifies the Fragment Type property on which the content index is defined through the given Composition |

EXAMPLE

<ContentIndex Name="ContentIndexPersonFields" Type="Core.Person">

ContentIndexField

The ContentIndexField element specifies a scalar property that is to be content-indexed. This is used to specify content-index on top level Item properties, Complex type properties, and Fragment properties.

| Attributes | | | |
|---|---|---|---|
| Attribute Name | Description | Type | Required |
| Property | Name of the property that is to be full-text indexed. Property has to be a top level property on the Type. It should be a scalar property, NOT an inline type property.<br>It should be a property defined by this Type, not a property inherited from the Base Type (see usage rules 3). | WinFSName | Always |
| Parent Elements | ContentIndex, ContentIndexComplexField, ContentIndexFragment | | |

| Child Element Sequence | | |
|---|---|---|
| Element | Occurrences | Notes |
| Documentation | 0:1 | Documentation |

EXAMPLE

1. <ContentIndexField Property="Name"/>

ContentIndexComplesField

The ContentIndexComplexField element specifies an inline property that is to be content-indexed.

| Attributes | | | |
|---|---|---|---|
| Attribute Name | Description | Type | Required |
| Property | Name of the inline property that is to be full-text indexed. It should be a property defined by this Type, not a property inherited from the Base Type (see usage rules 3) | WinFSName | Always |
| AsComplexType | Name of the inline Type that the 'Property' above should be indexed as. | WinFSName | Always |

-continued

| | |
|---|---|
| | This could be a derived type of the Inline type specified in the definition of 'Property'. This allows for Inline type substitutability |
| Parent Elements | ContentIndex, ContentIndexFragment, ContentIndexInlineField |

| Child Element Sequence | | |
|---|---|---|
| Element | Occurrences | Notes |
| ContentIndexField | 0:n | Specifies a scalar property within this Inline type on which the content index is defined |
| ContentIndexComplexField | 0:n | Specifies an property within this Complex type on which the content index is defined. This allows for indexing fields nested at any level of depth under the Item Type |

Note:
If there is a <ContentIndexComplexField Name="" AsType=""> specified, but there is no ContentIndexField child/grandchild/... for this ContentIndexComplexField node, i.e. there is no scalar property specified at the end of this Complex type chain, then it will be thrown up as a failure at schema installation time when we parse the content index specification. This is because ultimately a scalar property inside the Complex type MUST be specified for indexing.

EXAMPLE 1

```
<ContentIndexComplexField Property="HomeAddresses"
AsComplexType="Address">
    <ContentIndexField Property ="Street"/>
    <ContentIndexField Property ="City"/>
</ContentIndexComplexField>
```

EXAMPLE 2

Now if a new sub-type of the Address Complex Type called USAddress is added that defines a property called 'Zip', a content index can be defined on the 'zip' field of those instances of Person.HomeAddresses that are of Type USAddress.

```
<ContentIndexComplexField Property="HomeAddresses"
AsComplexType="USAddress">
    <ContentIndexField Property ="Zip"/>
</ContentIndexComplexField>
```

Thus when a content index is specified on a property in an Complex type, the specification should start all the way from the top-level Item type inside which this Complex type is used, as shown in the above example.

ContentIndexComposition

The ContentIndexComposition element is a used as a container to declare content index on WinFS fragment properties, where the fragment is the target End type of this composition. This element can contain only one ContentIndexFragment element, which corresponds to the target End type of the composition.

| Attributes | | | |
|---|---|---|---|
| Attribute Name | Description | Type | Required |
| Name | A name for the content ind | WinFSName | Always |
| Parent Elements | ContentIndex | | |

| Child Element Sequence | | |
|---|---|---|
| Element | Occurrences | Notes |
| ContentIndexFragment | 0:1 | Specifies a property on which the content index is defined. |

EXAMPLE

<ContentIndexComposition Name="MessageParticipants">

ContentIndexFragment

The ContentIndexFragment element specifies a fragment that is to be full-text Indexed.

| Attributes | | | |
|---|---|---|---|
| Attribute Name | Description | Type | Required |
| Type | Name of the type of the fragment that is to be full-text indexed. | WinFSName | Always |
| AsFragmentType | Name of the type of the fragment type that the 'Type' attribute above should be indexed as. This could be a derived type of the fragment type. This allows for | WinFSName | Always |

| Parent Elements | fragment type substitutability. ContentIndexComposition | |
|---|---|---|
| Child Element Sequence | | |
| Element | Occurrences | Notes |
| ContentIndexField | 0:n | Specifies a scalar property within this Inline type on which the content index is defined. |
| ContentIndexComplexField | 0:n | Specifies an Complex property within this Complex type on which the content index is defined. This allows for indexing fields nested at any level of depth under the Item Type |

EXAMPLE

```
<ContentIndexFragment         Type="MyParticipant"
AsFragmentType="Core.Participant">
```

Pseudo Syntax

```
<ContentIndex Name="content index name" Type="item type ">
    <ContentIndexField Property="prop name1"/>
    <ContentIndexComplexField Property="prop name2"
AsComplexType="Complex type1">
        <ContentIndexField Property="prop name3"/>
        <ContentIndexComplexField Property="prop name4"
AsComplexType="Complex type2">
            <ContentIndexField Property="prop name5"/>
            .
            .
        </ContentIndexComplexField>
    </ContentIndexComplexField>
    <ContentIndexComposition Name="Composition Name 1">
        <ContentIndexFragment Name="fragment name"
As FragmentType="Fragment type1">
            <ContentIndexField Property="prop name3"/>
            <ContentIndexComplexField Property="prop name4"
AsComplexType="Complex type2">
                <ContentIndexField Property="prop name5"/>
                .
                .
            </ ContentIndexComplexField >
        </ContentIndexFragment>
    </ContentIndexComposition>
    .
    .
</ContentIndex>
```

Content-Index Declaration Processing

Figure 9:
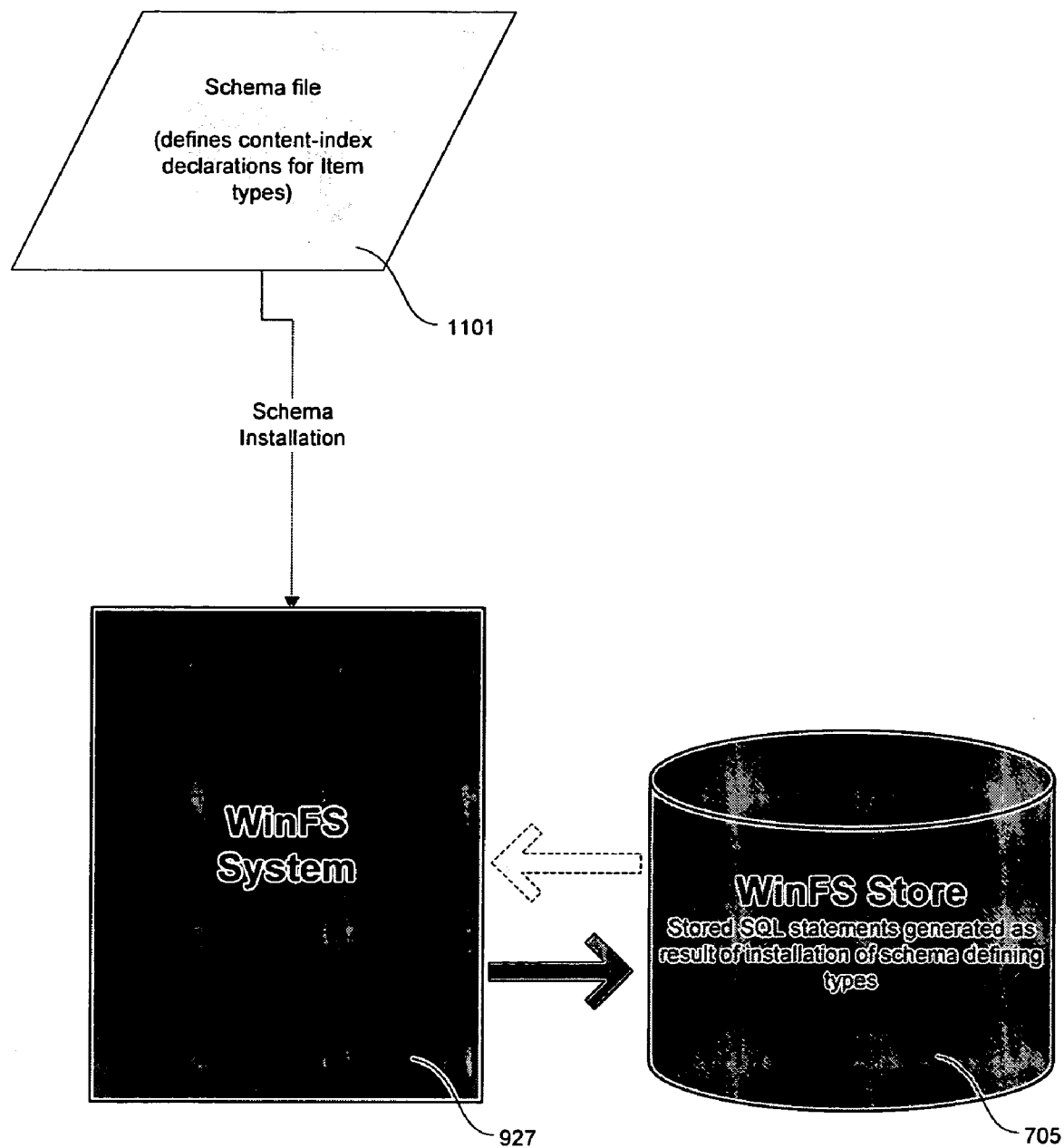
FIG. 9 is a diagram illustrating the installation of a schema with content-index declarations in WinFS.

An infrastructure is provided for installing the content-index definitions in the WinFS Store during schema installation. This includes parsing the content-index definitions in the schema, generation of appropriate SQL statements for data extraction and storing the SQL statements and associated metadata in the WinFS Store. Referring next to FIG. 9, shown is a diagram illustrating such installation of the schema 1101 as described above. The SQL statements generated as result of installation of schema defining types and content-index definitions are stored in the WinFS Store 705.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed:

1. A method for providing content index information for a data item comprising:
   generating a schema file that includes a data item type definition for a data item type and content index definitions for the data item type defined in said schema file, wherein the content index definitions are defined using a type-definition language to declare a content index on properties of the data item type defined in said schema file;
   generating query language statements for content index data extraction based on the content index definitions declared in the schema file; and
   storing the generated query language statements in a file system store.

2. The method of claim 1, wherein generating the schema file comprises annotating type-properties declared in the schema file by marking said type-properties for content indexing using the type-definition language.

3. The method of claim 1, wherein generating query language statements comprises generating statements that extract values of properties that are marked for full-text indexing.

4. The method of claim 1, wherein generating the schema file comprises defining the data item type in the schema file as a rich structured data type.

5. The method of claim 4, wherein generating the schema file comprises declaring the content index in the schema file for content indexing properties of the rich structured data type and for content indexing properties of sub-parts of the rich structured data type.

6. The method of claim 1, wherein generating query language statements comprises generating SQL statements.

7. A computer readable storage medium having computer-executable instructions stored thereon, wherein the computer executable instructions are executable by a computer for performing the steps of claim 1.

8. A computer readable storage medium having computer-executable instructions stored thereon, wherein the computer executable instructions are executable by a computer for performing the steps of claim 2.

9. A computer readable storage medium having computer-executable instructions stored thereon, wherein the computer executable instructions are executable by a computer for performing the steps of claim 3.

10. A computer readable storage medium having computer-executable instructions stored thereon, wherein the computer executable instructions are executable by a computer for performing the steps of claim 4.

11. A computer readable storage medium having computer-executable instructions stored thereon, wherein the computer executable instructions are executable by a computer for performing the steps of claim 5.

12. A computer readable storage medium having computer-executable instructions stored thereon, wherein the computer executable instructions are executable by a computer for performing the steps of claim 6.

13. A computing system comprising:
   a processing unit; and
   a memory system storing program instructions that are executable by the processing unit for:
      generating a schema file that includes a data item type definition for a data item type and content index definitions for the data item type defined in said schema file, wherein the content index definitions are defined using a type-definition language to declare a content index on properties of the data item type defined in said schema file;
      generating query language statements for content index data extraction based on the content index definitions declared in the schema file; and
      storing the generated query language statements in a file system store.

14. The system of claim 13, wherein the program instructions stored in the memory system are executable by the processing unit for annotating type-properties declared in the schema file by marking said type-properties for content indexing using the type-definition language.

15. The system of claim 14, wherein the program instructions stored in the memory system are executable by the processing unit for generating query language statements to extract values of properties that are marked for full-text indexing.

16. The system of claim 13, wherein the program instructions stored in the memory system are executable by the processing unit for defining the data item type in the schema file as a rich structured data type.

17. The system of claim 16, wherein the program instructions stored in the memory system include instructions that are executable by the processing unit for declaring the content index in the schema file by marking content indexing properties of the rich structured data type and content indexing properties of sub-parts of the rich structured data type.

18. The system of claim 13, wherein the program instructions stored in the memory system include instructions that are executable by the processing unit for generating the query language statements as SQL statements.

19. A computing system comprising:
   a data storage medium; and
   a data storage system to manage storage and access of data in the data storage medium, wherein data is stored as instances of data item types for specific types of data, which are defined in type schemas, and wherein the data storage system provides programmatic access to a system service to generate content index information for data items by (i) generating a schema file that includes a data item type definition for a data item type and content index definitions for the data item type defined in said schema file, wherein the content index definitions are defined using a type-definition language to declare a content index on properties of the data item type defined in said schema file, and (ii) installing the schema file to generate content index information for the data item.

20. The system of claim 19, wherein the data storage system provides programmatic access to the system service to generate content index information for data items by annotating type-properties declared in the schema file by marking said type-properties for content indexing using the type-definition language.

* * * * *